US012071911B1

(12) United States Patent
Alstad (10) Patent No.: US 12,071,911 B1
(45) Date of Patent: Aug. 27, 2024

(54) THRUST REVERSER FOR AERIAL VEHICLE

(71) Applicant: HONEYWELL INTERNATIONAL INC., Charlotte, NC (US)

(72) Inventor: Shawn Alstad, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/327,961

(22) Filed: Jun. 2, 2023

(51) Int. Cl.
*F02K 1/60* (2006.01)

(52) U.S. Cl.
CPC .................. *F02K 1/605* (2013.01)

(58) Field of Classification Search
CPC ............ F02K 1/605; F02K 1/60; F02K 1/763
See application file for complete search history.

(56) References Cited

U.S. PATENT DOCUMENTS

| 3,591,085 | A | * | 7/1971 | Medawar | .................. | F02K 1/36 239/265.17 |
| 6,151,885 | A | * | 11/2000 | Metezeau | ............... | F02K 1/605 239/265.29 |
| 9,719,465 | B2 | | 8/2017 | Suciu et al. | | |
| 9,765,729 | B2 | | 9/2017 | Aten et al. | | |
| 10,344,709 | B2 | | 7/2019 | Smith et al. | | |
| 11,293,378 | B2 | | 4/2022 | Tabouret et al. | | |
| 11,319,898 | B2 | | 5/2022 | Andrani | | |
| 2017/0204808 | A1 | * | 7/2017 | Smith | ....................... | F02K 1/62 |

FOREIGN PATENT DOCUMENTS

WO 2012097996 A1 7/2012

* cited by examiner

*Primary Examiner* — Katheryn A Malatek
(74) *Attorney, Agent, or Firm* — LORENZ & KOPF, LLP (57) ABSTRACT

A thrust reverser for an aerial vehicle is coupled to an engine associated with the aerial vehicle. The thrust reverser includes a housing configured to receive an exhaust flow. The housing is movable relative to the aerial vehicle between at least a first, stowed position and a second, deployed position. The housing includes at least one inner flange that defines a first curvature. The thrust reverser includes a pair of doors coupled to the housing. The pair of doors is movable between at least a first position and a second position based on a movement of the housing. Each door of the pair of doors includes a leading edge and a trailing edge. The trailing edge is downstream from the leading edge in a direction of the exhaust flow through the housing, and the leading edge has a second curvature that is substantially the same as the first curvature.

19 Claims, 7 Drawing Sheets

THRUST REVERSER FOR AERIAL VEHICLE

TECHNICAL FIELD

The present disclosure generally relates to vehicles, such as aerial vehicles, and more particularly relates to a thrust reverser for an aerial vehicle.

BACKGROUND

Generally, gas turbine engines on most jet-powered aerial vehicles, such as aircraft, include a thrust reverser. Thrust reversers enhance the stopping power of the aircraft by redirecting turbine engine exhaust flow in order to generate reverse thrust. Typically, thrust reversers have two distinct operating states: a forward (or stowed) state, in which the thrust reverser forms a portion of a gas turbine engine nacelle and forward thrust nozzle; and a reverse (or deployed) state, in which the thrust reverser forms a reverse flow path through which it redirects at least a portion of the gas turbine engine airflow to help decelerate the aircraft. In certain instances, in the reverse (or deployed) state, the thrust reverser directs a portion of the gas turbine engine airflow in a vertical direction, which reduces an efficiency of the thrust reverser. In addition, generally, at certain lower ground speeds, the thrust reverser is stowed to inhibit the flow of the portion of the gas turbine engine airflow into an inlet of an auxiliary power unit. This may increase the stopping distance of the aircraft.

Accordingly, it is desirable to provide a thrust reverser that directs the portion of the gas turbine engine airflow in a forward or oblique direction to improve an efficiency of the thrust reverser, while also enabling the thrust reverser to operate at lower ground speeds to reduce a stopping distance of the aircraft. Furthermore, other desirable features and characteristics of the present disclosure will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

According to various embodiments, provided is a thrust reverser for an aerial vehicle. The thrust reverser is coupled to an engine associated with the aerial vehicle. The thrust reverser includes a housing configured to receive an exhaust flow. The housing is movable relative to the aerial vehicle between at least a first, stowed position and a second, deployed position. The housing includes at least one inner flange that defines a first curvature. The thrust reverser includes a pair of doors coupled to the housing. The pair of doors is movable between at least a first position and a second position based on a movement of the housing. Each door of the pair of doors includes a leading edge and a trailing edge. The trailing edge is downstream from the leading edge in a direction of the exhaust flow through the housing, and the leading edge has a second curvature that is substantially the same as the first curvature.

In the first position, the leading edge of each door of the pair of doors is spaced apart from the at least one inner flange, and in the second position, the leading edge of each door of the pair of doors is in contact with the at least one inner flange to form a seal. The pair of doors are rotatable between at least the first position and the second position based on the movement of the housing, and the pair of doors are rotatable about a door angle that is less than 40 degrees. The pair of doors include a first door and a second door, and the thrust reverser includes a frame coupled to the housing. The first door is coupled to the frame with a first pivot pin, the second door is coupled to the frame with a second pivot pin, and the second curvature is defined based on a distance defined between the first pivot pin and the second pivot pin. The second curvature is defined by an arc that connects a first inboard point, an outboard point and a second inboard point, and the first inboard point, the outboard point and the second inboard point are located based on the distance between the first pivot pin and the second pivot pin. The first inboard point and the second inboard point are each defined horizontally based on the distance between the first pivot pin and the second pivot pin and are located on a centerline of the engine. The outboard point is defined horizontally based on the distance between the first pivot pin and the second pivot pin, and an intersection of each door of the pair of doors with an inner flow path defined by the thrust reverser. A location of the first pivot pin and the second pivot pin is based on an overall length of the thrust reverser. The thrust reverser includes at least one actuator, the housing has an outer housing surface opposite an inner housing surface, the at least one inner flange is defined on the inner housing surface and the at least one actuator is coupled to the frame and to the outer housing surface. The thrust reverser includes a transcowl coupled to the housing, and the transcowl is movable with the housing between the first, stowed position and the second, deployed position. The thrust reverser includes a pair of drag links, and each drag link of the pair of drag links couples each door of the pair of doors to the transcowl and each drag link of the pair of drag links is rigid with a fixed length. In the second, deployed position, an aperture is defined between the transcowl and the frame and in the second position, the pair of doors are configured to direct at least a portion of the exhaust flow substantially along an axis oblique to a centerline of the engine.

Further provided is a thrust reverser for an aerial vehicle. The thrust reverser is coupled to an engine associated with the aerial vehicle. The thrust reverser includes a housing configured to receive an exhaust flow, the housing movable relative to the aerial vehicle between at least a first, stowed position and a second, deployed position. The housing includes an outer housing surface opposite an inner housing surface, and the inner housing surface includes at least one inner flange that defines a first curvature. The thrust reverser includes a frame that couples the housing to the engine. The housing is movable relative to the frame. The thrust reverser includes a transcowl coupled to the housing to move with the housing. In the second, deployed position, an aperture is defined between a leading cowl edge of the transcowl and the frame. The thrust reverser includes a pair of doors coupled to the housing. The pair of doors is movable between at least a first position and a second position based on a movement of the housing. Each door of the pair of doors includes a leading edge and a trailing edge, and the trailing edge is downstream from the leading edge in a direction of the exhaust flow through the housing. The leading edge has a second curvature that is substantially the same as the first curvature. In the second position, the leading edge of each door of the pair of doors is in contact with the at least one inner flange to form a seal and to direct at least a portion of the exhaust flow substantially along an axis oblique to a centerline of the engine.

In the first position, the leading edge of each door of the pair of doors is spaced apart from the at least one inner flange and in the second position, the trailing edge of each door of the pair of doors is substantially in contact. The pair of doors are rotatable between at least the first position and the second position based on the movement of the housing, and the pair of doors are rotatable about a door angle that is less than 35 degrees. The pair of doors include a first door and a second door, and the thrust reverser includes the frame coupled to the housing. The first door is coupled to the frame with a first pivot pin, the second door is coupled to the frame with a second pivot pin, and the second curvature is defined based on a distance defined between the first pivot pin and the second pivot pin. The second curvature is defined by an arc that connects a first inboard point, an outboard point and a second inboard point, and the first inboard point, the outboard point and the second inboard point are located based on the distance between the first pivot pin and the second pivot pin. The first inboard point and the second inboard point are each defined horizontally based on the distance between the first pivot pin and the second pivot pin and are located on the centerline of the engine. The outboard point is defined horizontally based on the distance between the first pivot pin and the second pivot pin, and an intersection of each door of the pair of doors with an inner flow path defined by the thrust reverser. A location of the first pivot pin and the second pivot pin is based on an overall length of the thrust reverser.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of vehicle that would benefit from a thrust reverser, and the thrust reverser described herein for use with an aerial vehicle, such as an aircraft, rotorcraft, unmanned aerial vehicle and the like, is merely one exemplary embodiment according to the present disclosure. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

Figure 1:
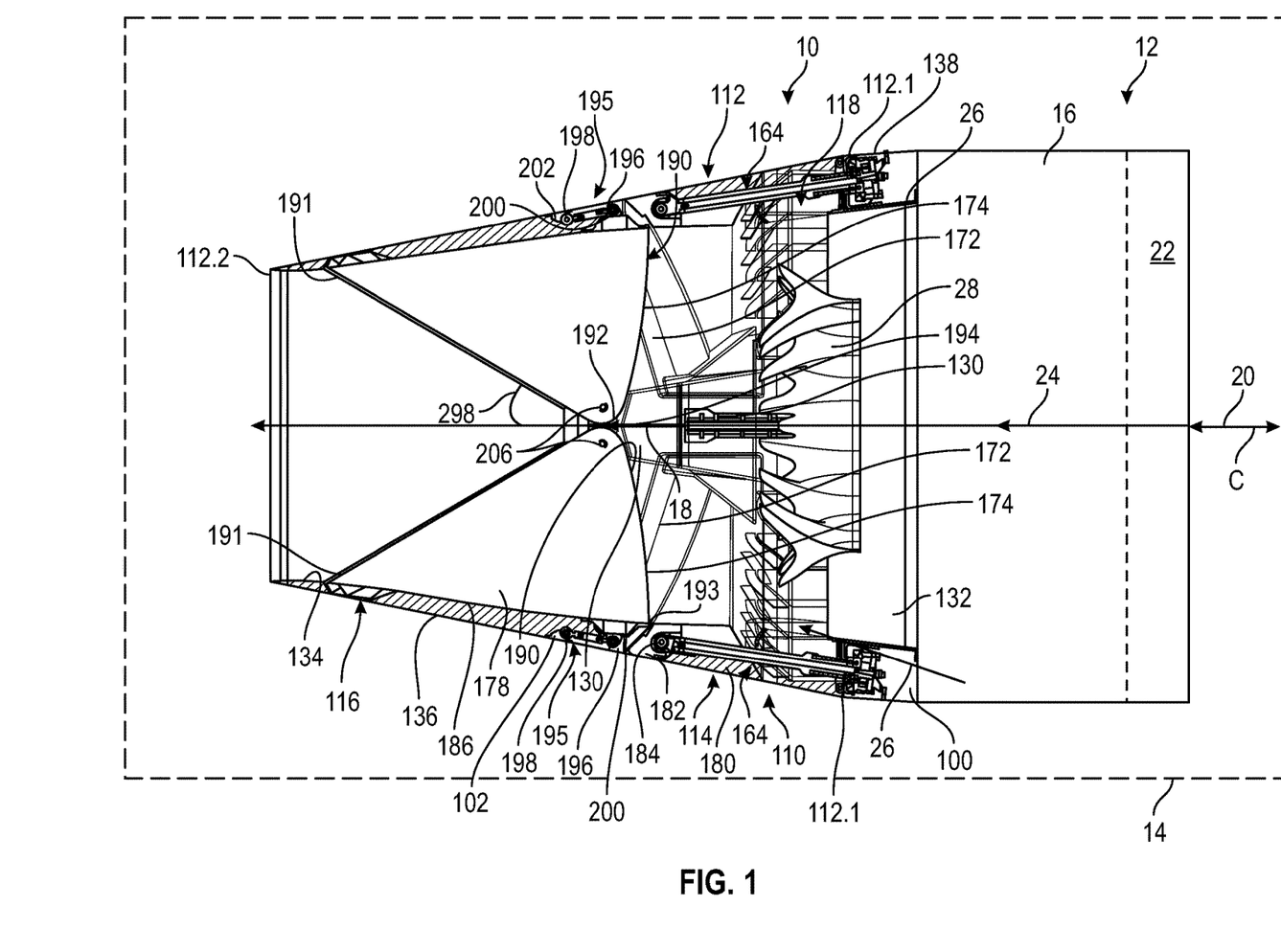
FIG. 1 is a schematic cross-sectional view of a thrust reverser for an aerial vehicle, in which the thrust reverser is in a first, stowed state in accordance with the various teachings of the present disclosure.

With reference to FIG. 1, a thrust reverser 10 is coupled to a gas turbine engine 12, which is associated with an aerial vehicle, such as an aircraft 14, in accordance with various embodiments. In FIG. 1, the thrust reverser 10 is in a first, stowed state. The thrust reverser 10 is shown in the second, deployed state in FIG. 2. The gas turbine engine 12 is a component of an aircraft's propulsion system that typically generates thrust by means of an accelerating mass of gas. In one example, the gas turbine engine 12 is a turbofan gas turbine engine. Generally, the gas turbine engine 12 is substantially encased within an aerodynamically smooth outer covering, such as a nacelle 16. The nacelle 16 substantially surrounds the gas turbine engine 12 and forms an aerodynamically shaped cavity around a centerline C of the gas turbine engine 12, thereby providing a flow path for exhaust flow 18 when the aircraft 14 is generating forward thrust. The thrust reverser 10 and the gas turbine engine 12 are substantially axi-symmetric about the centerline C. Generally, ambient air 20 enters the gas turbine engine 12 and passes through a fan 22. A portion of this air is received within a core of the gas turbine engine 12 where it is pressurized by one or more compressors associated with the gas turbine engine 12, and mixed with fuel and ignited within a combustion chamber associated with the gas turbine engine 12. The combustion of the pressurized air and fuel generates combustion products or hot gases known as core flow 24. The remainder of the air from the fan 22 bypasses the core of the gas turbine engine 12 and is known as fan flow 26. Together, the core flow 24 and the fan flow 26 mix downstream of a nozzle 28 to form the exhaust flow 18 that is discharged from the gas turbine engine 12, generating forward thrust.

Figure 3A:
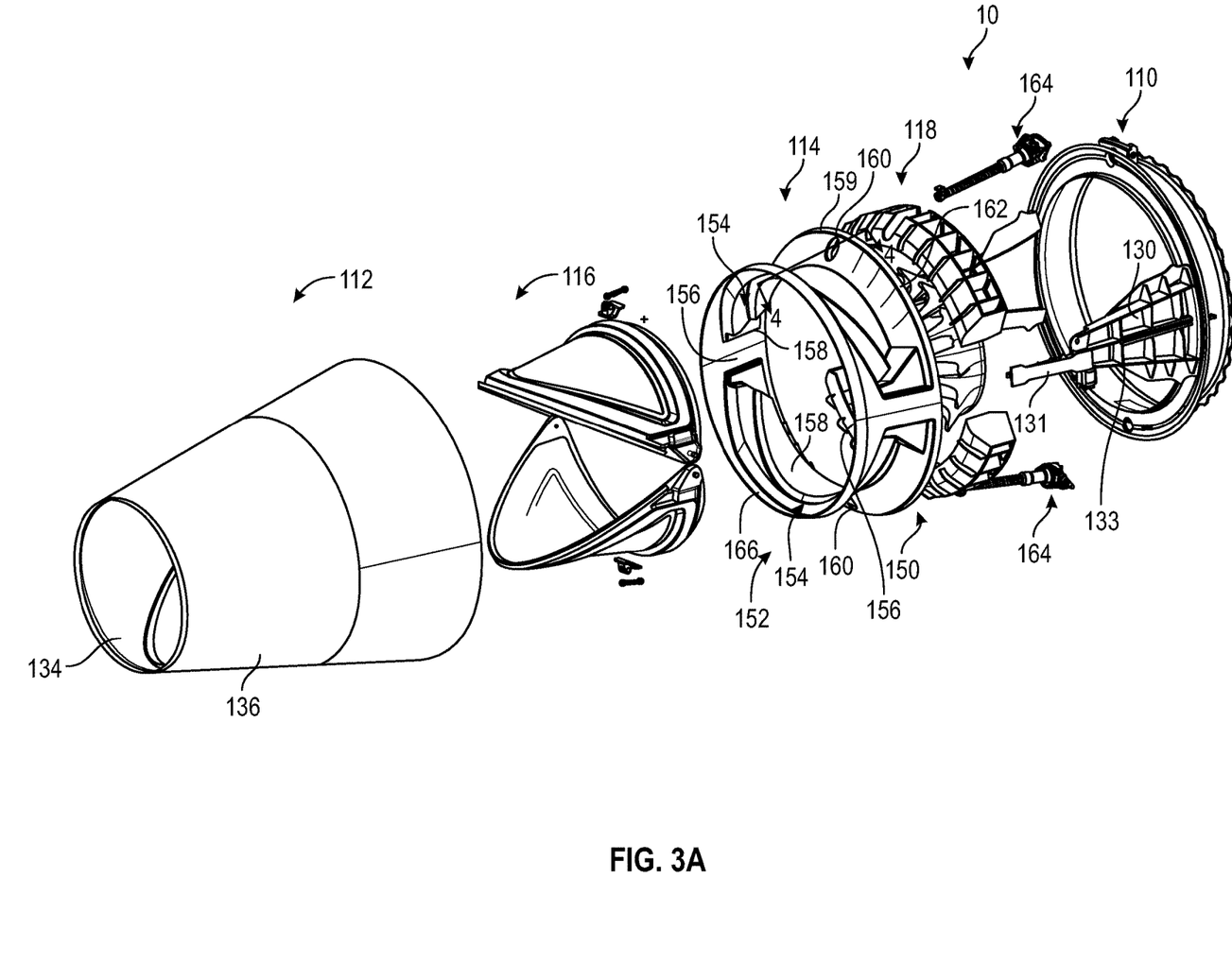
FIG. 3A is an exploded aft perspective view of the thrust reverser of FIG. 1.
Figure 3B:
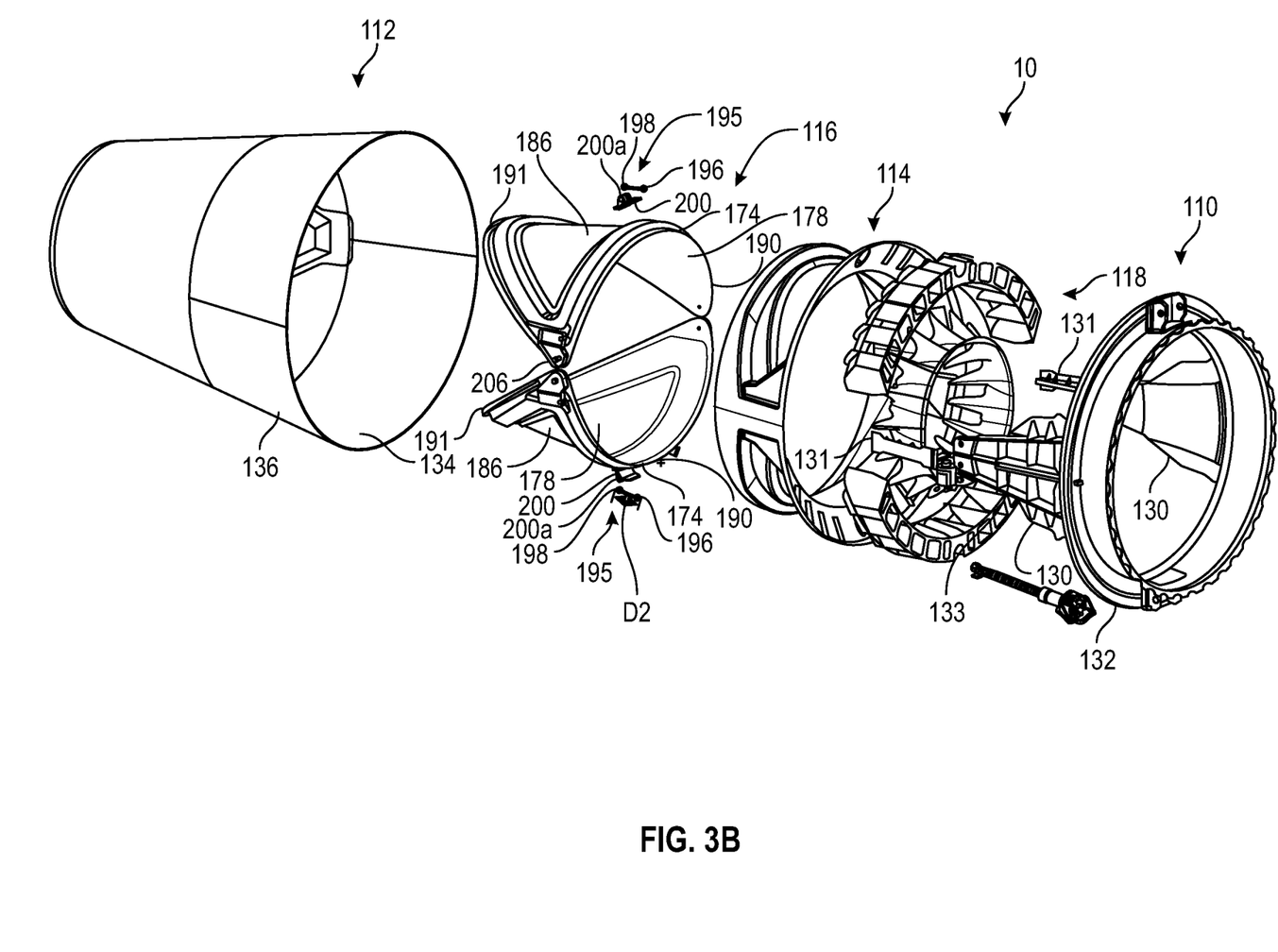
FIG. 3B is an exploded forward perspective view of the thrust reverser of FIG. 1.

The thrust reverser 10 is coupled to the nacelle 100, and surrounds the nozzle 28. With reference to FIGS. 3A and 3B, the thrust reverser 10 includes a stationary frame 110, an annular translatable cowl, or transcowl 112, a housing or cowl housing 114 and one or more doors 116 (two in the depicted embodiment). It should be noted that while the thrust reverser 10 is described herein as including an annular translatable cowl or transcowl, the various teachings of the present disclosure may be applicable to other types of thrust reversers. In various embodiments, the thrust reverser 10 also includes additional components, including, but not limited to, a vane array 118, a lock, one or more access panels and one or more sealing gaskets that surround the one or more access panels. For clarity, the various components, including the vane array 118, the lock, the one or more access panels and the one or more sealing gaskets are not shown in detail herein. As the vane array 118, the lock, the one or more access panels and the one or more sealing gaskets are generally known, the vane array 118, the lock, the one or more access panels and the one or more sealing gaskets will not be described in detail herein. Briefly, the vane array 118 assists in directing the fan flow 26 to mix with the core flow 24. The one or more access panels provide access to the various components of the thrust reverser 10, and the one or more sealing gaskets inhibit the flow of fluids into and out of the one or more access panels.

The frame 110 has an annular shape and may include associated support beams 130 and an annular front flange 132 that cooperate to provide a rigid structure. In one example, the support beams 130 are coupled to the front flange 132 via respective rails 131 and the support beams 130 extend aft axially from the front flange 132. The rails 131 are fixedly coupled to the front flange 132, and enable the support beams 130 to move with the transcowl 112. In one example, each support beam 130 defines a slot 133, and the respective rail 131 is received within and slidably coupled to the slot 133 to enable the support beams 130 to move or translate with a movement of the transcowl 112. A movement of the transcowl 112 results in a translation of the respective support beam 130 along the respective rail 131. Thus, generally, the frame 110 couples the thrust reverser 10 to the gas turbine engine 12. In this example, the transcowl 112 is coupled to the support beam 130 of the frame 110 and has an inner surface 134 and an outer surface 136. The transcowl 112 is axially translatable, relative to the frame 110, between a first, stowed position, which is the position depicted in FIG. 1, and a second, deployed position, which is the position depicted in FIG. 2. In the first, stowed position, a leading edge 112.1 of the transcowl 112 (FIG. 1) abuts a fan cowl door 138 disposed over the frame 110, and in the second, deployed position, the leading edge 112.1 of the transcowl 112 is displaced from the fan cowl door 138 and the frame 110 (FIG. 2) to form an aperture 140 between the transcowl 112 and the frame 110. Generally, the leading edge 112.1 of the transcowl 112 is flush with the fan cowl door 138 in the first, stowed position.

As will be discussed, with reference to FIG. 2, due to the shape of the doors 116, the reverse flow 142 is directed through the aperture 140 substantially along an axis A, which is oblique to the centerline C of the gas turbine engine 12. By providing the reverse flow 142 along the axis A, which is oblique to the centerline C of the gas turbine engine 12, the reverse flow 142 is directed forward and is more efficient in slowing the movement of the aircraft 14. Further, by directing the reverse flow 142 along the axis A, efflux acting on a tail of the aircraft 14 is reduced or minimized, which enables the thrust reverser 10 to remain in the second, deployed state during slower ground speeds, such as ground speeds of less than 60 knots. Thus, the thrust reverser 10 reduces a stopping distance associated with the aircraft 14. In addition, in the example of the aircraft 14 having a T-tail, directing the reverse flow 142 along the axis A minimizes impingement on the T-tail of the aircraft 14. Directing the reverse flow 142 along the axis A also inhibits the exhaust flow 18 from the gas turbine engine 12 from being received into an inlet of an auxiliary power unit (APU) associated with the aircraft 14.

Figure 4:
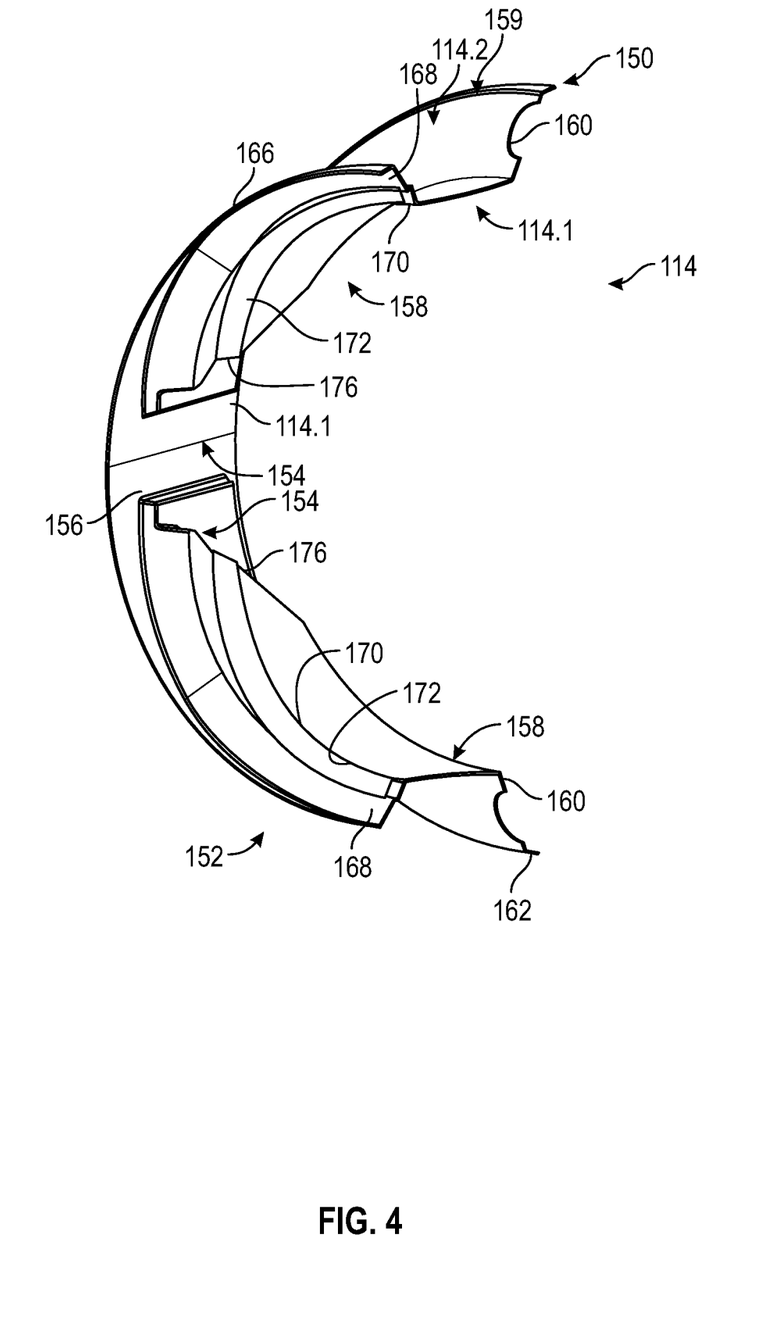
FIG. 4 is a cross-sectional view of a housing associated with the thrust reverser of FIG. 1.

The cowl housing 114 is coupled to the inner surface 134 of the transcowl 112, and moves the transcowl 112 between the first, stowed position and the second, deployed position based on a corresponding movement ortranslation of the cowl housing 114. The cowl housing 114 is coupled to the inner surface 134 via welding, mechanical fasteners, etc. In one example, the cowl housing 114 is composed of a metal or metal alloy, and is cast, stamped, additively manufactured, etc. With reference to FIGS. 3A and 4, the cowl housing 114 is annular, and includes a first housing end 150 opposite a second housing end 152. The cowl housing 114 also defines one or more door mating portions 154, one or more support beam surfaces 156 and one or more flow guiding portions 158 between the first housing end 150 and the second housing end 152. The exhaust flow 18 flows through the cowl housing 114 from the first housing end 150 to the second housing end 152.

The first housing end 150 includes a first flange 159 that surrounds the vane array 118. The first flange 159 defines one or more actuator bores 160 and a first lip 162. In this example, the thrust reverser 10 includes two actuators 164, and the first flange 159 includes two actuator bores 160. The actuator bores 160 enable a portion of the respective actuator 164 to pass through the cowl housing 114 to enable the translation of the transcowl 112 between the first, stowed position and the second, deployed position. The first lip 162 extends axially outward from the first flange 159 and is coupled to the inner surface 134 of the transcowl 112 (FIG. 6) via welding, mechanical fasteners, etc. The second housing end 152 includes a second lip 166. The second lip 166 extends axially outward and is coupled to the inner surface 134 of the transcowl 112 (FIG. 6) via welding, mechanical fasteners, etc.

Figure 5:
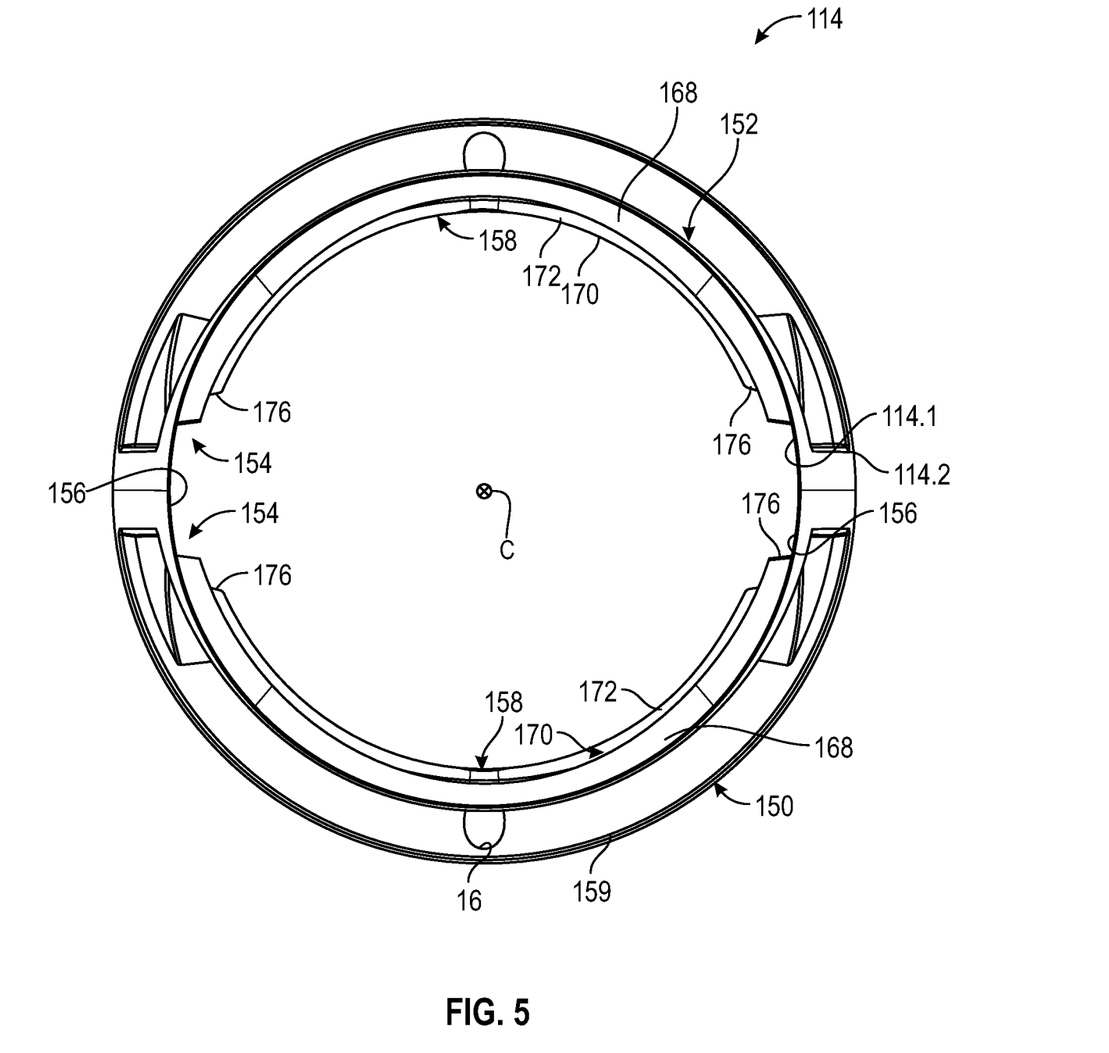
FIG. 5 is an aft end view of the housing.
Figure 6:
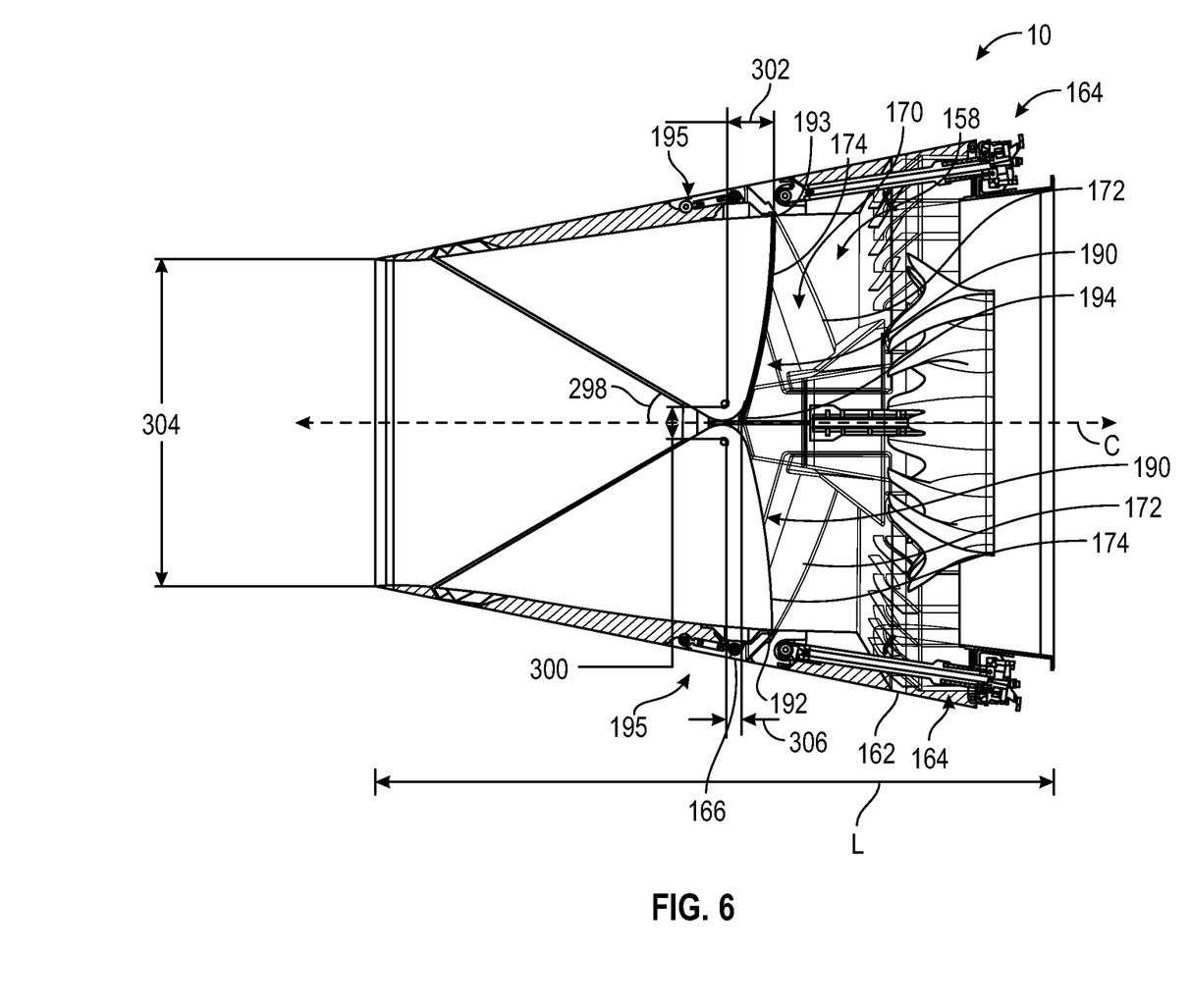
FIG. 6 is a cross-sectional view of the thrust reverser of FIG. 1, in which the thrust reverser is in the first, stowed state.

The door mating portions 154 are defined to extend axially inward from the second lip 166 to a respective one of the flow guiding portions 158. With reference to FIG. 5, the door mating portions 154 are defined opposite each other on an inner housing surface 114.1 of the cowl housing 114. An outer housing surface 114.2 is opposite the inner housing surface 114.1, and the outer housing surface 114.2 faces the inner surface 134 of the transcowl 112 (FIG. 6). The door mating portions 154 each include a guide 168 and an inner flange or inner housing flange 170. The guide 168 has a ramped surface, which is defined to extend along an axis that is oblique to the centerline C. The guide 168 is sized and shaped to position the respective inner housing flange 170 to contact the door 116 in a second position of the door 116. The inner housing flange 170 is configured to contact the respective door 116 in the second, deployed position of the transcowl 112. In one example, the inner housing flange 170 has a first curvature 172. As will be discussed, the first curvature 172 cooperates with a second curvature 174 of the respective door 116 to form a substantially airtight seal between the respective door 116 and the cowl housing 114. The first curvature 172 is substantially the same as the second curvature 174. When the doors 116 are in the second position, the door mating portions 154 cooperate with the doors 116 to redirect the exhaust flow 18 through the aperture 140 defined by the transcowl 112 in the second, deployed position (FIG. 2).

The support beam surfaces 156 are defined on opposite sides of the cowl housing 114, and are defined between the door mating portions 154. In this example, the support beam surfaces 156 are planar or flat and are defined by the inner housing surface 114.1 of the cowl housing 114. Generally, the support beam surfaces 156 are defined to have a shape that corresponds to a shape of the support beams 130 to provide clearance during a movement or translation of the cowl housing 114 relative to the fixed support beams 130. In addition, the door mating portions 154 and the respective flow guiding portion 158 may also include a contoured edge 176, which is also sized to provide clearance to the respective support beam 130. In this example, the contoured edge 176 is tapered from the guide 168 to the first flange 159. The contoured edge 176 is substantially triangular to provide clearance to the support beam 130.

With reference to FIG. 4, the flow guiding portions 158 are each defined between the respective door mating portions 154 and the first flange 159. Generally, the flow guiding portions 158 define a smooth surface, which is substantially flush with an inner surface 178 of the respective door 116 to enable the exhaust flow 18 to flow with minimal losses through the cowl housing 114.

In one example, with reference back to FIG. 1, the shape of the first flange 159 and the door mating portions 154 cooperate to define a chamber 180 between the cowl housing 114 and the inner surface 134 of the transcowl 112. In this example, a coupling flange 182 is coupled to each of the door mating portions 154 opposite the actuator bore 160 to enable the actuators 164 to be coupled to the cowl housing 114. Generally, the coupling flange 182 defines a bore that is coaxially aligned with a bore defined at an end of the respective actuator 164 so that a mechanical fastener 184, such as a bolt, may be used to couple the actuator 164 to the coupling flange 182. Generally, as will be discussed, a movement or translation of the actuator 164 results in a corresponding movement or translation of the cowl housing 114, which in turn, moves the transcowl 112 between the first, stowed position and the second, deployed position.

With additional reference to FIG. 3B, each of the doors 116 includes the inner surface 178 and an opposite outer surface 186, and is pivotally coupled to a respective one of the support beams 130 of the frame 110 via pivot pins 206. Each of the doors 116 is composed of a metal or metal alloy, and may be stamped, cast, forged, additively manufactured, etc. Each of the doors 116 also includes a leading edge 190 and a trailing edge 191. The trailing edge 191 is downstream of the leading edge 190 in a direction of the exhaust flow through the cowl housing 114. The leading edge 190 of each of the doors 116 has the second curvature 174.

Generally, the leading edge 190 is proximate or adjacent to the second housing end 152 when the transcowl 112 is in the first, stowed position (FIG. 1). In the second, deployed position, the leading edge 190 of each of the doors 116 contacts the inner housing flange 170 and seals against the inner housing flange 170 to substantially inhibit the flow of the exhaust flow 18 around the doors 116, ensuring that a substantial majority of the exhaust flow 18 is redirected by the doors 116 and exits through the aperture 140 (FIG. 2). The trailing edge 191 is spaced apart from the trailing edge 191 of the opposite door 116 when the transcowl 112 is in the first, stowed position (FIG. 1). In the second, deployed position, the trailing edge 191 of each of the doors 116 contacts each other to redirect the exhaust flow 18 through the aperture 140 (FIG. 2).

Each door 116 also includes a drag link 195. In one example, the drag link 195 has a first end 196 and an opposite second end 198, and a length DL defined from the first end 196 to the second end 198. In this example, the length DL is fixed, and is about 4 inches (in.). By providing the drag links 195 with a small length DL, the doors 116 generally rotate faster than the transcowl 112 translates. This ensures that the doors 116 rotate away and do not contact the transcowl 112 as the transcowl 112 translates. The first end 196 is coupled to the door 116. With additional reference to FIG. 1, the second end 198 is coupled to the inner surface 134 of the transcowl 112. Generally, the drag link 195 is substantially linear, and the first end 196 and the second end 198 of the drag link 195 defines a throughbore. In one example, the door 116 includes a bracket 200, which is coupled to the outer surface 136, via mechanical fastener(s), welding, etc. The bracket 200 includes a U-shaped receiving flange 200a that defines a throughbore to receive a mechanical fastener, such as a bolt, to couple the drag link 195 to the door 120. The transcowl 112 may also define a flange 202, which includes a throughbore that receives a mechanical fastener, such as a bolt, to couple the drag link 195 to the inner surface 134 of the transcowl 112. Generally, the first end 196 of the drag link 195 is coupled to the cowl housing 114 so as to be positioned at about 50% of a length L of the thrust reverser 10 (FIG. 6). The change in the position of the first end 196 of the drag link 195 from a first position to a second position of the doors 116 is about equal to the translation length of the transcowl 112. In this example, the translation length is about 10 inches (in.). The change in the position of the second end 198 of the drag link 195 from the first position to the second position of the doors 116 is about equal to a door angle 298 associated with the doors 116.

Figure 2:
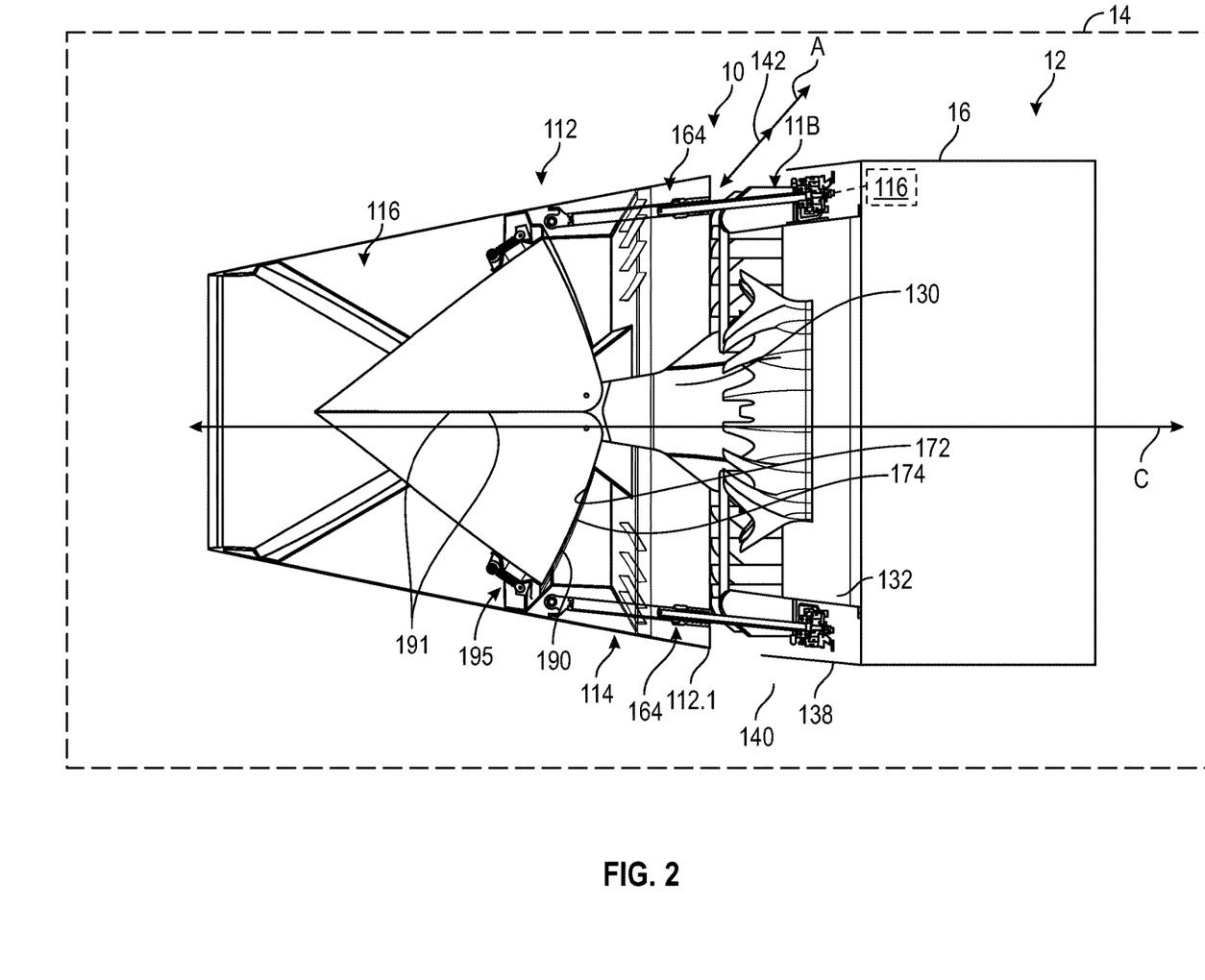
FIG. 2 is a schematic cross-sectional view of the thrust reverser of FIG. 1, in which the thrust reverser is in a second, deployed state in accordance with the various teachings of the present disclosure.

With reference to FIG. 6, each door 116 is rotatable, about a respective one of the pivot pins 206 that defines a pivot axis between the first position (FIG. 1) and the second position (FIG. 2). Generally, a first pivot pin or one of the pivot pins 206 is associated with a first door or one of the doors 116, and a second pivot pin or the other one of the pivot pins 206 is associated with a second door or the other one of the doors 116. Generally, each door 116 is rotatable, about the respective pivot pin 206, between the first position and the second position when the transcowl 112 and the cowl housing 114 moves or translates between the first, stowed position and the second, deployed position, respectively. In this regard, as the transcowl 112 translates, the second end 198 of each of the drag links 195, which is coupled to the transcowl 112, moves with the transcowl 112, which causes the first end 196 of the drag links 195 to rotate the respective door 116 from the first position to the second position (FIG. 2).

In one example, each of the doors 116 has the door angle 298 defined between the trailing edge 191 and the centerline C of the gas turbine engine 12. The door angle 298 is an acute angle, and is generally less than about 40 degrees. In one example, the door angle 298 is less than about 35 degrees, and in one example, is about 30 degrees. Generally, the door angle 298 is the amount of rotation each door 116 has between the first position and the second position. The door angle 298 may also be defined as the amount of rotation of each door 116 until the trailing edges 191 of the doors 116 touch, are substantially parallel, or substantially close to touching. Generally, the shallow door angle 298 provides for a more horizontal reverse flow vector or the reverse flow 142 along the axis A, which improves the efficiency of the thrust reverser 10.

The second curvature 174 is defined from a first inboard point 192 to an outboard point 193 to a second inboard point 194. Stated another way, the second curvature 174 is defined over an entirely of the leading edge 190 of each of the doors 116. The outboard point 193 of the leading edge 190 is proximate or adjacent to the inner surface 134 of the transcowl 112 or is positioned at the second housing end 152 of the cowl housing 114 when the transcowl 112 is in the first, stowed position and the door 116 is in the first position. The first inboard point 192 and the second inboard point 194 are each proximate or adjacent to the centerline C of the gas turbine engine 12 when the transcowl 112 is in the first, stowed position and the door 116 is in the first position. Stated another way, the outboard point 193 is radially outboard of the first inboard point 192 and the second inboard point 194, and the first inboard point 192 and the second inboard point 194 are proximate the pivot pins 206. With continued reference to FIG. 6, in one example, in order to define the second curvature 174 on the leading edge 190 of each of the doors 116, a pin to pin distance 300 is defined. The pin to pin distance 300 is a distance between the pivot pins 206 associated with the doors 116. Stated another way, the pin to pin distance 300 is a distance from one of the pivot pins 206 (or a first pivot pin) associated with one of the doors 116 (or the first door) to the other one of the pivot pins 206 (or a second pivot pin) associated with the other one of the doors 116 (or the second door). In one example, the pin to pin distance 300 is about 3.3 inches (in.) to about 4.3 inches (in.). Generally, the pivot pins 206 are located at about 50% of an overall length L of the thrust reverser 10, within +/−10%. In one example, the overall length L is about 66 inches (in.) and the location of the pivot pins 206 is at about 33 inches (in.).

Generally, the leading edge 190 of the door 116 is defined as about 1.25 times the pin to pin distance 300 within +/−25%. The outboard point 193 is defined horizontally at an outboard distance 302 from the respective one of the pivot pins 206 to an intersection of the leading edge 190 with a perimeter of an inner flow path 304 when the transcowl 112 is in the first, stowed position and the door 116 is in the first position. The inner flow path 304 is the largest diameter of the flow path defined by the doors 116 and the cowl housing 114 when the transcowl 112 is in the first, stowed position. In one example, the inner flow path 304 is about 38 inches (in.), and the outboard distance 302 is about 4.75 inches (in.). The first inboard point 192 is defined horizontally from the pivot pins 206 at an inboard distance 306. The inboard distance 306 is defined as the pin to pin distance 300 divided by two within +/−10%, and is located on the centerline C. The second inboard point 194 is defined horizontally from the pivot pins 206 at the inboard distance 306. In one example, the inboard distance 306 is about 1.9 inches (in.).

With the first inboard point 192, the outboard point 193, and the second inboard point 194 defined, an arc is drawn using a vertical constraint from the outboard point 193 to the first inboard point 192, and from the outboard point 193 to the second inboard point 194. The first curvature 172 of the inner housing flange 170 is defined using the same resultant arc, but when the cowl housing 114 is in the second, deployed position and the doors 116 are in the second position to ensure contact between the leading edge 190 and the inner housing flange 170. By providing the first curvature 172 and the second curvature 174 as substantially the same or the same, the efficiency of the thrust reverser 10 is improved as spillage or leakage about the doors 116 in the second position is substantially eliminated. In this example, the first curvature 172 and the second curvature 174 each comprise substantially the same compound curvature.

With reference back to FIG. 1, the actuators 164 move the cowl housing 114, and thus, the transcowl 112 between the first, stowed position and the second, deployed position. Generally, the actuators 164 are in communication with a controller associated with the aircraft 14 and are responsive to one or more control signals from the controller to move the cowl housing 114, and the transcowl 112, between the first, stowed position and the second, deployed position, and thus, move each of the doors 116 between the first position and the second position via the drag links 195. In this example, the transcowl 112 includes at least two actuators 164, however, it will be understood that any number of actuators 164 may be employed. The actuators 164 are coupled on opposite sides of the cowl housing 114, with one actuator 164 coupled to the cowl housing 114 at a first, upper end and another actuator 164 coupled to the cowl housing 114 at a second, lower end of the cowl housing 114. In this example, each of the actuators 164 comprise the actuator 122 described in commonly assigned U.S. patent application Ser. No. 17/662,684 filed on May 10, 2022, to Alstad et. al., titled "Actuator Systems for Thrust Reverser," the relevant portion of which is incorporated by reference herein. In the example of the actuators 164 comprising the actuators 122, the actuators 164 are responsive to fluid received by the controller to move or translate the cowl housing 114 relative to the nacelle 100 of the gas turbine engine 12. The actuators 164 each include a first actuator end opposite a second actuator end, such as the first actuator end 150 and the second actuator end 152 of commonly assigned U.S. patent application Ser. No. 17/662,684, previously incorporated by reference herein. The first actuator end of each of the actuators 164 is coupled to the frame 110, and is in fluid communication with a direction control unit to receive the fluid, such as the direction control unit 116 of commonly assigned U.S. patent application Ser. No. 17/662,684, previously incorporated by reference herein. The second actuator end is coupled to coupling flange 182 of the cowl housing 114. It should be noted that in other embodiments, the actuators 164 may comprise a leadscrew or ball screw electric linear actuator, if desired.

With the doors 116 defined with the second curvature 174 and the cowl housing 114 defined with the first curvature 172, the thrust reverser 10 may be assembled. In one example, the cowl housing 114 is coupled to the transcowl 112 at the first housing end 150 and the second housing end 152. The doors 116 are positioned within the cowl housing 114 and coupled to the support beams 130 via the pivot pins 206. The drag links 195 are coupled to the respective one of the doors 116 and to the transcowl 112. The frame 110 is assembled, and the frame 110 is coupled to the nacelle 100. The actuators 164 are coupled to the cowl housing 114 and the frame 110, and are placed in communication with the direction control unit, for example.

The actuators 164 are responsive to fluid received from the direction control unit to move or translate the transcowl 112 between the first, stowed position (FIG. 1) and the second, deployed position (FIG. 2), thereby pivoting each of the doors 116 between the first position (FIG. 1) and the second position (FIG. 2). In the first, stowed position, the leading edge 190 of the doors 116 is spaced apart from the inner housing flange 170, and the doors 116 cooperate with the transcowl 112 to enable the portion of the exhaust flow 18 to follow the inner flow path 304 and exit through a second, terminal end 112.2 of transcowl 112.

With reference to FIG. 2, the transcowl 112 is in the second, deployed position, and the doors 116 have pivoted about the pivot pins 206 to the second position. In order to move the transcowl 112 to the second, deployed position, and thus, the doors 116 to the second position, the actuators 164 have moved from a first state (FIG. 1) to a second state (FIG. 2). In the second state, the actuators 164 are extended, such that the leading end 112.1 of the transcowl 112 is spaced apart from the nacelle 100 to define the aperture 140. The movement of the cowl housing 114, and thus, the transcowl 112 to the second, deployed position moves the doors 116 to the second position. Generally, as the doors 116 pivot about the pivot axis defined by the pivot pins 206, the doors 116 follow a path that is provided by the translation of the rigid drag links 195 by the transcowl 112. With the doors 116 in the second position, the exhaust flow 18 is directed outward through the aperture 140, creating the reverse flow 142 that flows along the axis A. In the second position, the second curvature 174 of the doors 116 corresponds to the first curvature 172 of the inner housing flange 170, which substantially inhibits the exhaust flow 18 from leaking or flowing past the doors 116, thereby improving an efficiency of the thrust reverser 10.

Thus, the thrust reverser 10, having the doors 116 with the second curvature 174 that is substantially the same as the first curvature 172 of the cowl housing 114 has an improved efficiency. The improved efficiency of the thrust reverser 10 results in shorter stopping distances for the aircraft 14. In one example, the efficiency of the thrust reverser 10 is improved by about 7%. In addition, by providing the doors 116 with the shallow door angle 298, the doors 116 redirect the portion of the exhaust flow 18 substantially oblique to the centerline C along the axis A or forward, which results in a much higher reverse flow efficiency and substantially inhibits the reverse flow 142 from reaching a tail of the aircraft 14. The second curvature 174 and the door angle 298 of the doors 116 also enables the thrust reverser 10 to remain deployed during slower ground speeds (about 60 knots or less), which also results in much shorter stopping distances for the aircraft 14 without introducing the exhaust flow 18 into an inlet of an auxiliary unit associated with the aircraft 14. In addition, by having the second curvature 174 of the doors 116 substantially the same as the first curvature 172 of the cowl housing 114 and the doors 116 with the door angle 298, a mechanical advantage is provided during the operation of the doors 116, which improves reliability of the thrust reverser 10 and also provides less wear on the actuators 164. Further, by resting on or contacting the cowl housing 114 in the second position, the doors 116 transfer loads experienced during the operation to the cowl housing 114 instead of the actuators 164, which improves a life of the actuators 164 and may enable the use of smaller actuators 164.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A thrust reverser for an aerial vehicle, the thrust reverser coupled to an engine associated with the aerial vehicle, and the thrust reverser comprising:
    a housing configured to receive an exhaust flow, the housing movable relative to the aerial vehicle between at least a first, stowed position and a second, deployed position, and the housing includes at least one inner flange that defines a first curvature; and
    a pair of doors coupled to the housing, the pair of doors movable between at least a first position and a second position based on a movement of the housing, each door of the pair of doors including a leading edge and a trailing edge, the trailing edge downstream from the leading edge in a direction of the exhaust flow through the housing at least when the housing is in the first, stowed position, and the leading edge has a second curvature that is substantially the same as the first curvature,
    wherein the pair of doors comprise a first door and a second door, the thrust reverser further comprises a frame coupled to the housing, the first door is coupled to the frame with a first pivot pin, the second door is coupled to the frame with a second pivot pin, and the second curvature is defined based on a distance defined between the first pivot pin and the second pivot pin.

2. The thrust reverser of claim 1, wherein in the first position, the leading edge of each door of the pair of doors is spaced apart from the at least one inner flange, and in the second position, the leading edge of each door of the pair of doors is in contact with the at least one inner flange to form a seal.

3. The thrust reverser of claim 1, wherein the pair of doors are rotatable between at least the first position and the second position based on the movement of the housing, and the pair of doors are rotatable less than 40 degrees.

4. The thrust reverser of claim 1, wherein the second curvature is defined by an arc that connects a first inboard point, an outboard point and a second inboard point, and the first inboard point, the outboard point and the second inboard point are located based on the distance between the first pivot pin and the second pivot pin.

5. The thrust reverser of claim 4, wherein the first inboard point and the second inboard point are each defined horizontally based on the distance between the first pivot pin and the second pivot pin and are located on a centerline of the engine.

6. The thrust reverser of claim 4, wherein the outboard point is defined horizontally based on the distance between the first pivot pin and the second pivot pin, and an intersection of each door of the pair of doors with an inner flow path defined by the thrust reverser.

7. The thrust reverser of claim 1, wherein a first location of the first pivot pin and a second location of the second pivot pin are each based on an overall length of the thrust reverser.

8. The thrust reverser of claim 1, further comprising at least one actuator, the housing has an outer housing surface opposite an inner housing surface, the at least one inner flange is defined on the inner housing surface and wherein the at least one actuator is coupled to the frame and to the outer housing surface.

9. The thrust reverser of claim 1, further comprising a transcowl coupled to the housing, the transcowl movable with the housing between the first, stowed position and the second, deployed position.

10. The thrust reverser of claim 9, further comprising a pair of drag links, wherein each drag link of the pair of drag links couples each door of the pair of doors to the transcowl and each drag link of the pair of drag links is rigid with a fixed length.

11. The thrust reverser of claim 9, wherein in the second, deployed position, an aperture is defined between the transcowl and the frame and in the second position, the pair of doors are configured to direct at least a portion of the exhaust flow substantially along an axis oblique to a centerline of the engine.

12. A thrust reverser for an aerial vehicle, the thrust reverser coupled to an engine associated with the aerial vehicle, and the thrust reverser comprising:
  a housing configured to receive an exhaust flow, the housing movable relative to the aerial vehicle between at least a first, stowed position and a second, deployed position, the housing includes an outer housing surface opposite an inner housing surface, and the inner housing surface includes at least one inner flange that defines a first curvature;
  a frame that couples the housing to the engine, the housing movable relative to the frame;
  a transcowl coupled to the housing to move with the housing, and in the second, deployed position, an aperture is defined between a leading cowl edge of the transcowl and the frame; and
  a pair of doors coupled to the housing, the pair of doors movable between at least a first position and a second position based on a movement of the housing, each door of the pair of doors including a leading edge and a trailing edge, the trailing edge downstream from the leading edge in a direction of the exhaust flow through the housing at least when the housing is in the first, stowed position, the leading edge has a second curvature that is substantially the same as the first curvature, and in the second position, the leading edge of each door of the pair of doors is in contact with the at least one inner flange to form a seal and to direct at least a portion of the exhaust flow substantially along an axis oblique to a centerline of the engine.

13. The thrust reverser of claim 12, wherein in the first position, the leading edge of each door of the pair of doors is spaced apart from the at least one inner flange and in the second position, the trailing edge of each door of the pair of doors is in contact with each other.

14. The thrust reverser of claim 12, wherein the pair of doors are rotatable between at least the first position and the second position based on the movement of the housing, and the pair of doors are rotatable less than 35 degrees.

15. The thrust reverser of claim 12, wherein the pair of doors comprise a first door and a second door, the thrust reverser further comprises the frame coupled to the housing, the first door is coupled to the frame with a first pivot pin, the second door is coupled to the frame with a second pivot pin, and the second curvature is defined based on a distance defined between the first pivot pin and the second pivot pin.

16. The thrust reverser of claim 15, wherein the second curvature is defined by an arc that connects a first inboard point, an outboard point and a second inboard point, and the first inboard point, the outboard point and the second inboard point are located based on the distance between the first pivot pin and the second pivot pin.

17. The thrust reverser of claim 16, wherein the first inboard point and the second inboard point are each defined horizontally based on the distance between the first pivot pin and the second pivot pin and are located on the centerline of the engine.

18. The thrust reverser of claim 16, wherein the outboard point is defined horizontally based on the distance between the first pivot pin and the second pivot pin, and an intersection of each door of the pair of doors with an inner flow path defined by the thrust reverser.

19. The thrust reverser of claim 15, wherein a first location of the first pivot pin and a second location of the second pivot pin are each based on an overall length of the thrust reverser.

* * * * *